United States Patent
Lamaze et al.

(10) Patent No.: US 7,238,390 B2
(45) Date of Patent: *Jul. 3, 2007

(54) COATING PRECURSOR AND METHOD FOR COATING A SUBSTRATE WITH A REFRACTORY LAYER

(75) Inventors: Airy-Pierre Lamaze, Reaumont (FR); Christian Barthelemy, Voiron (FR); Thomas Spadone, Sao Paulo (BR); Robert Rey-Flandrin, Saint Etienne de Crossey (FR)

(73) Assignees: Aluminium Pechiney, Paris (FR); Pechiney Rhenalu, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/491,447

(22) PCT Filed: Oct. 14, 2002

(86) PCT No.: PCT/FR02/03517

§ 371 (c)(1),
(2), (4) Date: Jul. 8, 2004

(87) PCT Pub. No.: WO03/033436

PCT Pub. Date: Apr. 24, 2003

(65) Prior Publication Data

US 2004/0249038 A1 Dec. 9, 2004

(30) Foreign Application Priority Data

Oct. 15, 2001 (FR) .................................. 01 13267
Oct. 11, 2002 (FR) ..................... PCT/FR02/03485

(51) Int. Cl.
*B05D 3/02* (2006.01)

(52) U.S. Cl. ................ 427/372.2; 427/387; 427/421.1; 427/427.4; 427/461; 427/475

(58) Field of Classification Search ............. 427/372.2, 427/387, 421.1, 427.4, 441, 475
See application file for complete search history.

(56) References Cited

U.S. PATENT DOCUMENTS 3,928,668 A * 12/1975 Snow ......................... 427/469
4,039,401 A * 8/1977 Yamada et al. ............. 205/384
4,292,345 A   9/1981 Kolesnik et al.
4,496,469 A   1/1985 Morimoto et al.
4,659,586 A * 4/1987 Schittenhelm et al. ...... 427/486
5,215,801 A   6/1993 Wong
5,310,476 A   5/1994 Sekhar et al.
5,399,441 A   3/1995 Bearinger et al.
5,578,365 A * 11/1996 Kume et al. ............. 428/195.1
5,589,222 A * 12/1996 Thometzek et al. ........ 427/215
5,741,842 A * 4/1998 Huggins et al. ............ 524/500
5,776,235 A * 7/1998 Camilletti et al. ......... 427/96.2
5,851,677 A  12/1998 Laurent et al.
6,210,791 B1  4/2001 Skoog et al.
6,211,307 B1 * 4/2001 Iwabuchi et al. ........... 525/477
6,294,261 B1 * 9/2001 Sangeeta et al. ........... 428/469
6,319,973 B1 11/2001 Lemm et al.
6,413,578 B1  7/2002 Stowell et al.
6,715,196 B2 * 4/2004 Reising et al. .............. 427/405

FOREIGN PATENT DOCUMENTS

| | | |
|---|---|---|
| DE | 41 22 764 | 1/1993 |
| DE | 36 38 937 | 5/1998 |
| EP | 275008 | 7/1988 |
| EP | 601317 | 6/1994 |
| EP | 834489 | 4/1998 |
| EP | 994158 | 4/2000 |
| EP | 1088908 | 4/2001 |
| GB | 1461155 | 1/1977 |
| JP | 04 300251 | 10/1992 |
| RU | 2149168 | 5/2000 |

* cited by examiner

*Primary Examiner*—Archene Turner
(74) *Attorney, Agent, or Firm*—Dennison, Schultz & MacDonald

(57) ABSTRACT

The purpose of the invention is a coating precursor comprising a silicone resin and a mineral filler capable of chemically reacting so as to produce a solid layer on a substrate and a cohesive refractory layer after a calcination operation. The precursor may also include an additive capable of reducing its viscosity. Another purpose of the invention is a method for coating a given surface of a substrate with at least one refractory layer containing silicon in which the substrate is coated with a coating precursor according to the invention so as to form a green layer and a heat treatment is carried out to calcine the said green layer and to form a cohesive refractory layer. The invention is a means of obtaining a protective coating capable of resisting oxidising environments, liquid metal and a solid or molten salt.

22 Claims, No Drawings

COATING PRECURSOR AND METHOD FOR COATING A SUBSTRATE WITH A REFRACTORY LAYER

This application is a filing under 35 USC 371 of PCT/FR02/03517, filed Oct. 14, 2002.

1. Field of the Invention

This invention relates to the protection of objects and materials for use in the metallurgical industry, and particularly the aluminium industry. In particular, it relates to protective coatings for the said objects and materials.

2. Description of Related Art

The objects and materials used in the aluminium industry are frequently exposed to corrosive environments and subjected to high temperatures and severe thermal constraints. Containers (such as ladles and furnaces), ducts (such as troughs, injectors and casting nozzles) and tools and devices designed to handle and treat liquid aluminium (such as filters and rotors) must have good mechanical and chemical strength. In particular, the surfaces of these objects that are exposed to liquid aluminium must not dissolve in liquid aluminium nor contaminate it.

Although the strength of materials typically used in the aluminium industry is generally sufficient, there are some applications or conditions for which an even higher strength is required. This is the case particularly when it is required to reduce the number of inclusions per tonne of cast aluminium to almost zero.

Therefore, the applicant looked for means of handling, producing, treating and casting aluminium and liquid aluminium alloys satisfactorily under the most demanding conditions and applications.

SUMMARY OF THE INVENTION

An object of the invention is a coating precursor to be used for the formation of a protective layer on a substrate. The said precursor comprises a silicone resin (or organosiloxane) and a mineral filler capable of reacting chemically with the said resin so as to produce a cohesive refractory layer after a calcination operation of the layer.

The said precursor, which is typically in the form of a powder, is preferably homogenous.

DETAILED DESCRIPTION OF THE INVENTION

The silicone resin is a polysiloxane preferably comprising a proportion of OH groups, such as a polymethylsiloxane, a polydimethylsiloxane, a polymethylsilsesquioxane, or a mixture thereof, comprising a proportion of OH groups substituted for methyl groups. The applicant has noted that the proportion of OH groups is preferably between about 0.5% and about 2%. If the proportion of OH groups is too low, there will not be sufficient propension to form a solid layer with good cohesiveness after calcination. A very high proportion of OH groups may make the polysiloxane difficult to produce at an acceptable cost. The silanol (Si—OH) groups are preferably stable so that the resin can be stored. These OH groups may be grafted to a polysiloxane by hydrolysis. The siloxanic patterns of the polysiloxane according to the invention are advantageously wholly or partly trifunctional or quadrifunctional.

The mineral filler is typically chosen from among metal borides, carbides, nitrides and oxides, or from among non-metal borides, carbides and nitrides (such as boron nitrides) or a combination or a mixture thereof. The said mineral filler is advantageously chosen from among metal compounds such as metal oxides, metal carbides, metal borides and metal nitrides, or a combination or a mixture thereof. The mineral filler is preferably capable of chemically reacting with the silicone resin so as to produce a refractory layer with good cohesiveness after calcination of the said green layer. The mineral filler may be chosen as a function of the physicochemical characteristics expected from the coating (such as wettability or non-wettability by a liquid metal).

The metal compound is advantageously alumina, $ZrO_2$, $ZrB_2$, $TiB_2$ or $TiO_2$ or a combination or a mixture thereof. The alumina is preferably a reactive calcined alpha alumina called a technical alumina, with a very low hydration ratio (typically less than 1%, or even less than 0.5%).

The mineral filler is preferably in the form of a powder. The size grading of the mineral filler powder is typically such that the size of the grains is between 1.5 μm and 100 μm.

The physical properties of the coating, such as its mechanical properties (including resistance to thermal shock), can sometimes be adapted by adjusting the proportion of the mineral filler and/or its size grading.

The proportion of silicone resin in the precursor is typically between 10 and 20% by weight, to enable satisfactory ceramisation of the coating during calcination.

The proportion of the mineral filler in the precursor is typically between 80% and 90% by weight.

According to an advantageous variant of this invention, the precursor also includes an additive capable of reducing the viscosity of the precursor. The said additive typically comprises a dispersing agent such as stearic acid. The proportion of the said additive in the precursor is typically less than 2% by weight, and more typically between 0.1 and 1%.

In this embodiment, the precursor is typically obtained by mixing the resin, the mineral filler and the additive, and if necessary grinding the mixture.

Another object of the invention is a method for coating a given surface of a substrate with at least one refractory layer containing silicon wherein:
  the substrate is coated with a coating precursor according to the invention so as to form a green layer;
  a heat treatment called calcination treatment is carried out to eliminate volatile materials, to calcine the said green layer and to form a cohesive refractory layer.

The applicant has observed that the method according to the invention can give a strong thin layer bonding strongly to the substrate that has good resistance to liquid metal and that has good cohesiveness.

The substrate may be coated (typically including the deposition and spreading of the said precursor on the substrate) by any known means, and preferably by electrostatic powder sprinkling. The temperature of the substrate may possibly be increased above the ambient temperature before coating in order to facilitate the formation of a homogenous deposit and bonding of the deposition by melting of the resin.

The method according to the invention may also comprise complementary operations such as preparation of the parts of the substrate surface to be coated and/or drying of the green coating before the heat treatment. The preparation of the substrate surface typically includes cleaning and/or degreasing (for example using acetone).

The so-called calcination heat treatment comprises at least one step at a high temperature, typically between 650 and 1300° C., and more typically between 800 and 1300° C., capable of transforming the green layer into a refractory ceramic, that is advantageously in the vitreous state. The composition of the vitreous phase typically comprises between 5 and 25% by weight of silica obtained from the resin (the remainder, typically 75 to 95% by weight, consists essentially of the mineral filler). The calcination temperature also depends on the substrate; for example, in the case of a metallic substrate, it is advantageously less than the softening temperature of the substrate. Furthermore, it is also preferable to use a calcination temperature greater than the working temperature of the coated substrate. The heat treatment may include an intermediate step at a temperature of between 200 and 600° C. (typically between 200 and 250° C.). This intermediate step is preferably capable of causing crosslinking of the resin, and possibly decomposition of the resin, before "ceramisation" (or final calcination) of the coating. In this case, it is possible, according to an advantageous variant of the invention, to continue in situ calcination heat treatment, in other words when using the substrate at high temperature (preferably higher than 650° C.).

The duration of the heat treatment is preferably such that it enables complete ceramisation of the precursor. The temperature increase is advantageously sufficiently slow to prevent the coating from cracking.

During the heat treatment, the organic compounds are eliminated (by evaporation and/or by decomposition) leaving a refractory solid on a surface of the substrate. For example, this solid may be formed from metal originating from the metal compound and silicon originating from the silicone resin. In the case of alumina, silanol groups Si—OH of the polysiloxane seem to create covalent links with the OH groups of alumina, the said links seem to transform into Si—O—Al links with release of water, during the heat treatment to form an aluminosilicate, which is advantageously in the vitreous state. A similar mechanism may occur with metal compounds other than alumina.

The ambient atmosphere during the calcination treatment is advantageously non-oxidizing, particularly to prevent oxidation of the substrate at the substrate-coating interface that could cause decohesion between the substrate and the coating, or even destruction of the substrate (for example when the substrate is made of graphite).

The final coating may comprise two or more successive layers that may be applied by coatings and successive heat treatments, i.e. by successive coating/heat treatment sequences. In other words, the layer coating and calcination treatment operations are repeated for each elementary layer in the final coating. The successive layers may have a different composition, such that they have different chemical and mechanical properties. This variant provides a means of adapting each layer to a local function, such as bond to the substrate for the first layer, mechanical strength for intermediate layers and chemical resistance for the surface layer.

Another object of the invention is a substrate in which at least part of the surface comprises at least one refractory layer obtained using the said precursor or using the said coating method, the said refractory layer being advantageously in the vitreous state, with or without a gradient of the composition in the direction perpendicular to the surface of the substrate.

Another object of the invention is the use of the said precursor or the said coating method for the protection of a substrate, particularly for the protection of a material and/or a piece of equipment that will be exposed to an oxidising environment, or liquid metal (particularly aluminium, an aluminium alloy, magnesium or a magnesium alloy, in the liquid state) and/or a solid or molten salt.

The term "substrate" must be understood in the broad sense: the substrate may be made of metal (such as an iron-nickel-chromium based alloy (typically a steel or inconel)), or a refractory material or a carbonaceous material (such as graphite), or a mixture or a combination thereof; it may be a particular object (typically a piece of equipment, such as a metallic or refractory component of a casting unit, a nozzle, a liquid metal distributor in a sump, a screen made of steel (particularly stainless steel) or a refractory or ceramic material, a metallic or refractory filter, a liquid metal or gas bubbles injector, a rotor, a scraper, a pouring spout, an ultrasound sensor, a measurement sensor (ultrasound, temperature, etc.) designed to be immersed in liquid metal, parts made of carbonaceous materials, bricks made of graphite, etc.), or a material, particularly a coating material (such as a brick made of a refractory material or a carbonaceous material (such as graphite) ). The substrate may be porous or non-porous.

Tests

Several tests have been carried out on different substrates. These tests were carried out using the following components:

Mineral Fillers:

calcined alpha alumina powders (alumina ref. P152SB and AC44 made by the Aluminium Pechiney company) with a $D_{50}$ of 1.5 µm and 50 µm respectively and a BET specific surface area of 3 and 1 m$^2$/g, respectively;

a TiB$_2$ powder (reference ESK type S) with a $D_{50}$ of 45 µm;

Silicone resin: a MK polymethylsiloxane made by the Wacker company which is a trifunctional resin with about 1% of OH groups. This resin was composed of about 80% of silica equivalent and 20% of methyl groups, which dissociate at a temperature of the order of 450° C.;

Powder compositions were tested. They had the following compositions (% by weight): 85.25% of mineral filler (alumina or TiB$_2$), 14.49% of silicone resin and 0.26% of stearic acid as an additive to reduce the viscosity of the mixture. The proportions were such that the refractory coating obtained comprised about 88% by metal compound equivalent weight (or mixture of metal compounds) and 12% by silica equivalent weight.

The powders were prepared with equipment known in plastic technologies, including a mixer. A composition based on 100 g of filler was added into this mixer, preheated to 100° C. so that work could be done above the resin melting point and below the resin crosslinking temperature. At this temperature, the resin melted and was intimately mixed with the filler. A hard block was obtained after cooling. This block was ground, firstly with a jaw crusher down to a size grading of 1 mm, and then with a ball mill until the size grading was smaller than 150 µm.

The powders obtained were deposited by electrostatic powder sprinkling on different substrates, such as nozzles and grids made of 304 L stainless steel.

The coated substrates were crosslinked at a temperature of 240° C. for one hour.

The final thickness of the coating was typically of the order of 50 µm for a layer. This coating was very homogenous and strong (with good cohesiveness and non-powdering) and did not block the openings of grids when they were used.

Substrates thus coated were dipped directly in liquid aluminium at a temperature of about 710° C. Ceramisation was done in situ.

No degradation to the coating was observed after several hours, or even several days, of immersion.

The invention claimed is:

1. Method for coating a surface of a substrate with at least one refractory layer containing silicon, comprising the steps of:
preparing a coating precursor comprising a silicone resin and a mineral filler capable of chemically reacting with the said resin so as to produce a cohesive refractory layer after a calcination operation, said coating precursor being prepared in the form of a powder containing about 10% to 20% by weight of said resin, said resin being selected from the group consisting of polymethylsiloxanes, polymethylsilsesquioxanes and mixtures thereof, comprising a proportion of OH groups substituted for methyl groups;
coating the surface by electrostatic powder sprinkling with the coating precursor, so as to form a green layer;
performing a calcination heat treatment to eliminate volatile materials from the coating precursor, calcine the green layer and form a cohesive refractory layer.

2. Method according to claim 1, wherein the silicone resin includes trifunctional or quadrifunctional siloxanic patterns.

3. Method according to claim 1, wherein the mineral filler is selected from the group consisting of metal oxides, metal and non-metal carbides, metal and non-metal borides, metal and non-metal nitrides, and mixtures thereof.

4. Method according to claim 3, wherein the mineral filler comprises a calcined alpha alumina.

5. Method according to claim 3, wherein the mineral filler is selected from the group consisting of $ZrO_2$, $ZrB_2$, $TiB_2$, $TiO_2$, boron nitride, and mixtures thereof.

6. Method according to claim 1, wherein the mineral filler is in the form of a powder with a grain size of between 1.5 µm and 100 µm.

7. Method according to claim 1, wherein the precursor contains between 10 and 20% by weight of the silicone resin.

8. Method according to claim 1, wherein the precursor contains between 80 and 90% by weight of the mineral filler.

9. Method according to claim 1, wherein the precursor also includes an additive reducing the viscosity of the precursor.

10. Method according to claim 9, wherein the additive comprises a dispersing agent.

11. Method according to claim 10, wherein the dispersing agent is a stearic acid.

12. Method according to claim 9, wherein the precursor contains less than 2% by weight of the additive.

13. Method according to claim 12, wherein the precursor contains between 0.1 and 1% by weight of the additive.

14. Method according to claim 1, wherein the substrate is increased in temperature above ambient temperature before coating.

15. Method according to claims 1, wherein the calcination comprises at least one step at a temperature of between 650 and 1300° C. transforming the green layer into a refractory ceramic.

16. Method according to claim 1, wherein the heat treatment comprises an intermediate step at a temperature of between 200 and 600° C.

17. Method according to claim 1, wherein the refractory layer is formed from a plurality of successive layers.

18. Method according to claim 1, wherein the substrate is made of metal, a refractory material, a carbonaceous material, or a combination thereof.

19. Method according to claim 18, wherein the metal is an iron-nickel-chromium based alloy.

20. Method according to claim 1, wherein the substrate is selected from the group consisting of metallic or refractory components of a casting unit, nozzles, liquid metal distributors in a sump, screens made of steel, stainless steel, a refractory material or ceramic, metallic filters, refractory filters, liquid metal injectors, gas bubble injectors, rotors, scrapers, pouring spouts, ultrasound sensors, measurement sensors designed to be immersed in liquid metal, bricks made of refractory material, parts made of carbonaceous materials and bricks made of graphite.

21. Method according to claim 1, wherein the heat treatment is carried out in a non-oxidizing atmosphere.

22. Method according to claim 1, wherein the proportion of OH groups substituted for methyl groups is between about 0.5% and about 2%.

* * * * *